Figure 1:
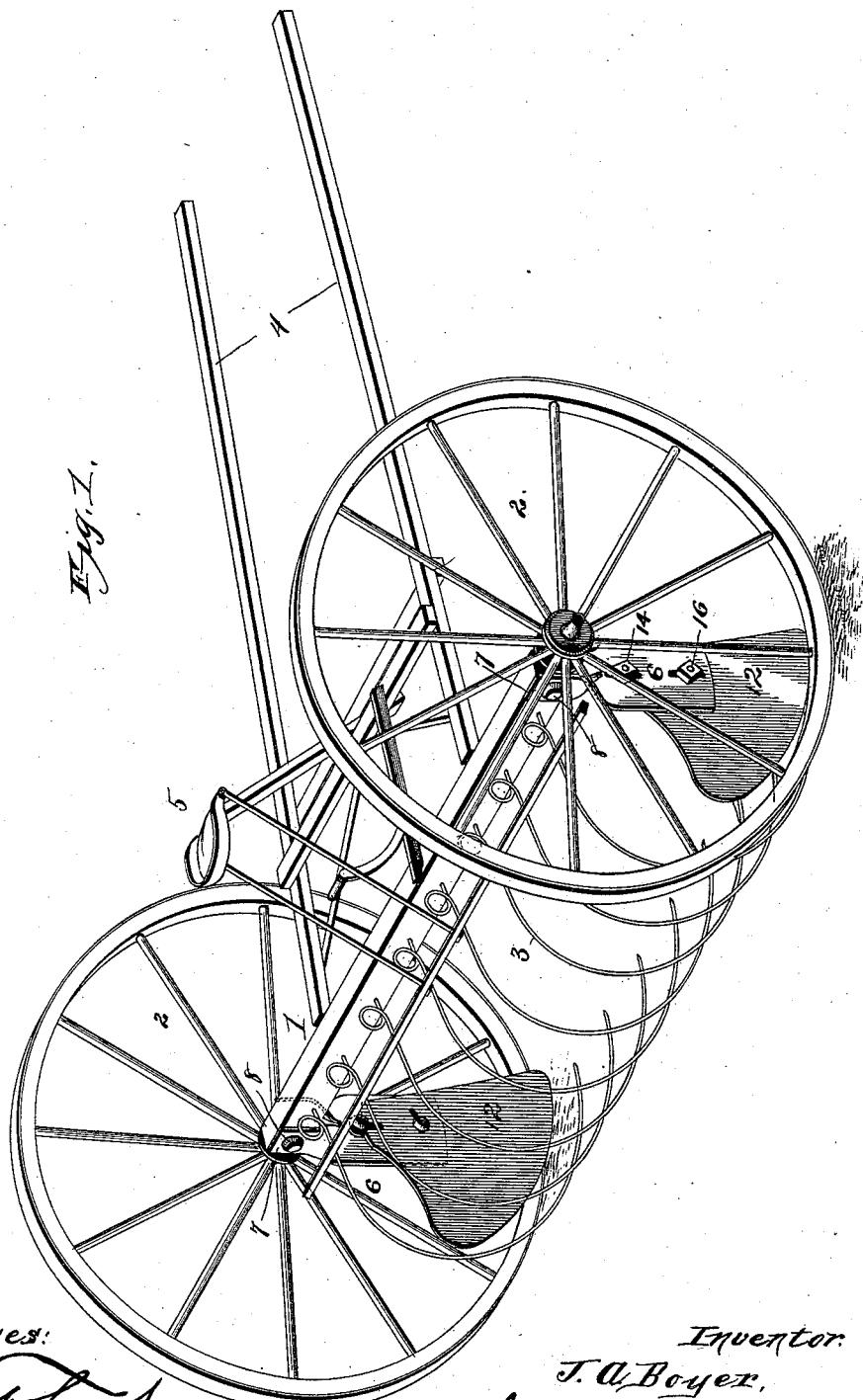

(No Model.) 2 Sheets—Sheet 1.
J. A. BOYER.
GUARD FOR HORSE RAKE TEETH.

No. 456,214. Patented July 21, 1891.

Witnesses: Inventor:
J. A. Boyer,
by Higdon & Higdon,
Attorneys.

(No Model.) 2 Sheets—Sheet 2.
J. A. BOYER.
GUARD FOR HORSE RAKE TEETH.
No. 456,214. Patented July 21, 1891.
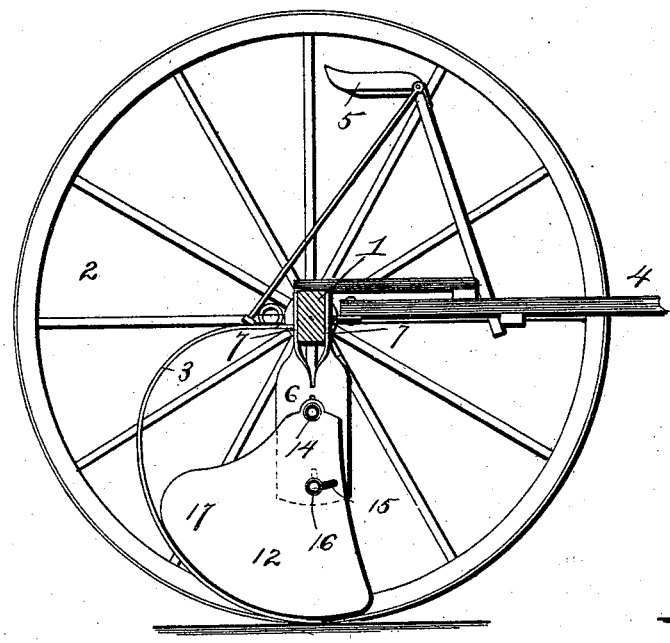
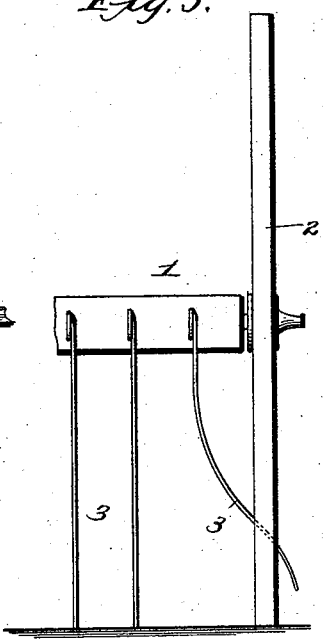
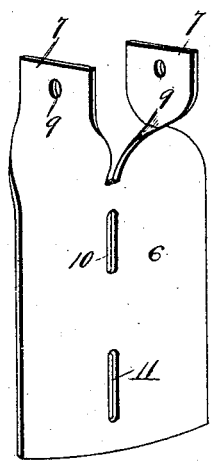
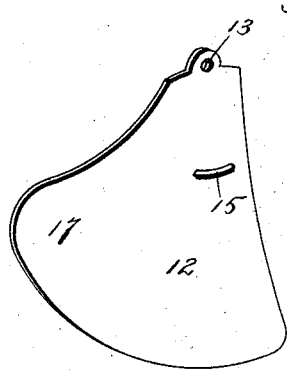
Witnesses.
Inventor:
J. A. Boyer,
by Higdon & Higdon,
Attorneys.

UNITED STATES PATENT OFFICE.

JAMES A. BOYER, OF SENECA, KANSAS.

GUARD FOR HORSE-RAKE TEETH.

SPECIFICATION forming part of Letters Patent No. 456,214, dated July 21, 1891.

Application filed February 19, 1891. Serial No. 382,083. (No model.)

*To all whom it may concern:*

Be it known that I, JAMES A. BOYER, of Seneca, Nemaha county, Kansas, have invented certain new and useful Improvements in Guards for Horse-Rake Teeth, of which the following is a full, clear, and exact description, reference being had to the accompanying drawings, forming a part hereof.

My invention relates to that class of agricultural machines known as "horse-rakes" or "sulky-rakes," which are drawn across the field to gather up the hay and dump it into the windrows.

The objects of my invention are to provide an attachment which shall be capable of application to a great variety of rakes and which shall prevent the end rake-teeth from being bent or broken by being caught in the spokes of the carrying-wheels; also, to provide an attachment which shall prevent the hay from being wasted by working out endwise between the end rake-teeth and the carrying-wheels, such wasting of the hay being due to the springing of the teeth as they catch in the stubble or in projections of the ground.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of a sulky-rake with my improvements applied thereto. Fig. 2 is a transverse vertical section of the same. Fig. 3 is a detached perspective view of one of the hangers for the guards or shields. Fig. 4 is a detached perspective view of one of the guards or shields. Fig. 5 is a rear elevation of a portion of a sulky-rake, showing one of the end rake-teeth bent by being caught in the spokes of the carrying-wheel, such being prevented by my improvements.

In using horse-rakes or sulky-rakes of various types great delay and annoyance has resulted from the frequent bending, breaking, or twisting of the teeth at the ends of the rake, due to such teeth becoming caught or entangled in the spokes of the carrying-wheels while the machine is being turned around in the field. This breaking or twisting of the end rake-teeth has occurred without any apparent cause; but careful observation has shown me that it is due to the lateral strains exerted by the machine upon the teeth while the machine is being turned. This action is very clearly shown in Fig. 5 of the drawings, in which an end tooth 3 is shown as caught in the spokes of a carrying-wheel 2 and twisted out of proper shape. The result is in this event that if the machine is not stopped in time the tooth will be broken off, and in any event it will be badly distorted, thus causing much loss of time and the expense of repair or replacement by a new tooth. A further defect of this class of machines is that the hay works out endwise between the teeth at the ends of the rake and the carrying-wheels, such waste of the hay being due to the curved form of the teeth and also to their springing or vibrations as they strike obstructions on the ground or become caught in the stubble. As will be seen from the ensuing description, these defects are entirely removed and overcome by my improvements.

Referring now to the drawings, 1 designates the axle, 2 the carrying-wheels, and 3 the teeth of a sulky or horse rake. These parts are of the usual or any preferred type of construction, shafts 4 being shown to receive the draft-animal, and a suitable seat 5 being provided for the driver or attendant. It is to be understood that the rake may be either of the precise form and arrangement shown or of any other suitable or preferred type, my improvements hereinafter described being designed for application to a great variety of types of rakes. At each end of the axle 1 is attached a pendent hanger 6, which is of oblong rectangular shape, and the upper end of which is bifurcated to form two arms 7, which are turned so as to extend parallel with each other transversely to the body portion of the hanger. These two arms 7 of each hanger embrace one end of the axle from below, one arm lying against the front and the other against the rear side of said axle. A suitable bolt 8 extends through eyes 9 in the arms 7 and also transversely through the end of the axle, so that the hangers are each detachably secured to the axle in such manner as to intervene between the inner side of each carrying-wheel 2 and the adjacent end tooth of the rake proper. Two vertically-elongated openings or slots 10 11 are formed in the middle of the body portion of the hanger and are arranged the one directly above the other, as shown in Fig. 3. The purpose of these two openings will be presently explained.

12 designates the guards or shields, one of which is attached to each hanger, so as to depend therefrom between the inner side of each carrying-wheel and the adjacent end tooth of the rake. Each of these guards, shields, or fenders is of closed triangular form, so that its marginal contour corresponds approximately to the form of the rake-teeth, and said shields are preferably of metal, as are also the hangers 6, above described. At its upper end each guard or shield is formed with an eye or hole 13 to receive a bolt 14, which passes also through the upper slot 10 of the hanger 6. In the upper part of each guard or shield 12, just below the eye 13, is formed a horizontally-elongated segmental opening or slot 15, through which extends a bolt 16, which also passes through the lower opening 11 of the hanger 6. It will thus be seen that the bolts 14 16 serve as the means for attaching the guards or fenders 12 to the hangers 6, and also that the guards can be readily set higher up or lower down upon the hangers 6 as the form of the machine or the condition of the ground or of the crop renders desirable. The rearwardly-extending portion 17 of each guard, shield, or fender 12 conforms approximately to the form or direction of extent of the teeth 3, and it will be seen that the segmental slot 15 enables the guard to be set farther backward or forward, as the position or particular form of the teeth may require. Thus each of the guards or shields 12 is pendent from one end of the axle and is interposed between the inner side of each carrying-wheel and the outer side of the adjacent end tooth of the rake proper. By this arrangement it is impossible for either of the end teeth to become caught in the spokes of the carrying-wheel as the machine is turned in the field, because any lateral strain upon the teeth will simply bring them against the guards or shields, and the latter will then act as supports for the teeth, thus preventing them from being twisted or broken.

The attachment is simple, strong, and durable, and is capable of application to a great variety of types of rakes. While the guards, shields, or fenders are preferably of triangular form, as described, it is to be understood that such form may be varied to accord with different forms or shapes of rake-teeth without departing from the essential spirit of my invention.

Having thus described my invention, what I claim as new therein, and desire to secure by Letters Patent, is—

1. An improved attachment for horse-rakes, &c., comprising a hanger having its upper end divided into two parallel attaching arms designed to embrace the axle of the machine, and formed also with two vertical slots arranged one above the other, and a guard, fender, or shield conforming approximately to the shape of the rake-teeth and formed at its upper part with an eye and also with a curved slot located beneath said eye, and a pair of bolts extending through said openings, substantially as set forth.

2. An improved attachment for horse-rakes, &c., comprising a hanger having its upper end divided into two parallel attaching arms extending transversely of the plane of the hanger and designed to embrace the axle of the machine, and formed also with two vertical slots arranged one above the other, and a guard, fender, or shield conforming approximately in marginal contour to the shape of the rake-teeth and formed at its upper part with an eye and also with a curved slot located beneath said eye, and a pair of bolts extending through said openings, substantially as set forth.

In testimony whereof I affix my signature in presence of two witnesses.

JAMES A. BOYER.

Witnesses:
C. C. K. SCOVILLE,
W. T. BEHNE.